US008300069B2

(12) United States Patent
Langendijk et al.

(10) Patent No.: US 8,300,069 B2
(45) Date of Patent: Oct. 30, 2012

(54) OPTIMAL BACKLIGHTING DETERMINATION APPARATUS AND METHOD

(75) Inventors: Erno Hermanus Antonius Langendijk, Eindhoven (NL); Oleg Belik, Eindhoven (NL); Gerben Johan Hekstra, Eindhoven (NL); Mark Jozef Willem Mertens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 746 days.

(21) Appl. No.: 12/301,649

(22) PCT Filed: May 21, 2007

(86) PCT No.: PCT/IB2007/051908

§ 371 (c)(1),
(2), (4) Date: Nov. 20, 2008

(87) PCT Pub. No.: WO2007/135642

PCT Pub. Date: Nov. 29, 2007

(65) Prior Publication Data

US 2009/0115803 A1 May 7, 2009

(30) Foreign Application Priority Data

May 24, 2006 (EP) .................................... 06114488

(51) Int. Cl.
*G09G 3/36* (2006.01)
*G09G 5/10* (2006.01)
*G06K 9/00* (2006.01)

(52) U.S. Cl. ......................... 345/690; 345/102; 382/162

(58) Field of Classification Search .................. 345/1.3, 345/102, 88, 211, 231, 89, 204, 94, 82, 629, 345/107, 207, 426, 690–691; 362/29; 445/23; 349/61, 68; 382/162; 348/14.01, 253; 358/1.9
See application file for complete search history.

(56) References Cited

U.S. PATENT DOCUMENTS

| | | | | |
|---|---|---|---|---|
| 5,159,445 | A * | 10/1992 | Gitlin et al. | 348/14.01 |
| 6,621,482 | B2 | 9/2003 | Fuller | |
| 7,663,597 | B2 * | 2/2010 | Plut | 345/102 |
| 2001/0035853 | A1 | 11/2001 | Hoelen et al. | |
| 2002/0070914 | A1 * | 6/2002 | Bruning et al. | 345/102 |
| 2004/0051724 | A1 | 3/2004 | Elliott et al. | |
| 2005/0140612 | A1 | 6/2005 | Baek | |

(Continued)

FOREIGN PATENT DOCUMENTS

EP 1569195 A1 8/2005

(Continued)

*Primary Examiner* — Quan-Zhen Wang
*Assistant Examiner* — Lin Li
(74) *Attorney, Agent, or Firm* — Mark L. Beloborodov

(57) ABSTRACT

To have an optimal use of a display for displaying particular, e.g. chromatically biased, image content, described is a method of calculating an optimal first and second backlight driving level, for a color display having a backlight which can be controlled to produce a first amount of light with a first spectrum in accordance with the first backlight driving level and a second amount of light with a second spectrum in accordance with the second backlight driving level, and the color display having a first and second light transmission valve plus color filter combination, arranged to create from the backlight spectra a respective first and second color primary light output, the chromaticity of at least one of the color primaries depending on the first and second backlight driving level, wherein the first and second backlight driving levels are determined so that a gamut of at least a part of a picture to be displayed is optimally covered by the gamut realizable by the display with the first and second backlight driving level.

12 Claims, 6 Drawing Sheets

U.S. PATENT DOCUMENTS

Figure 1:
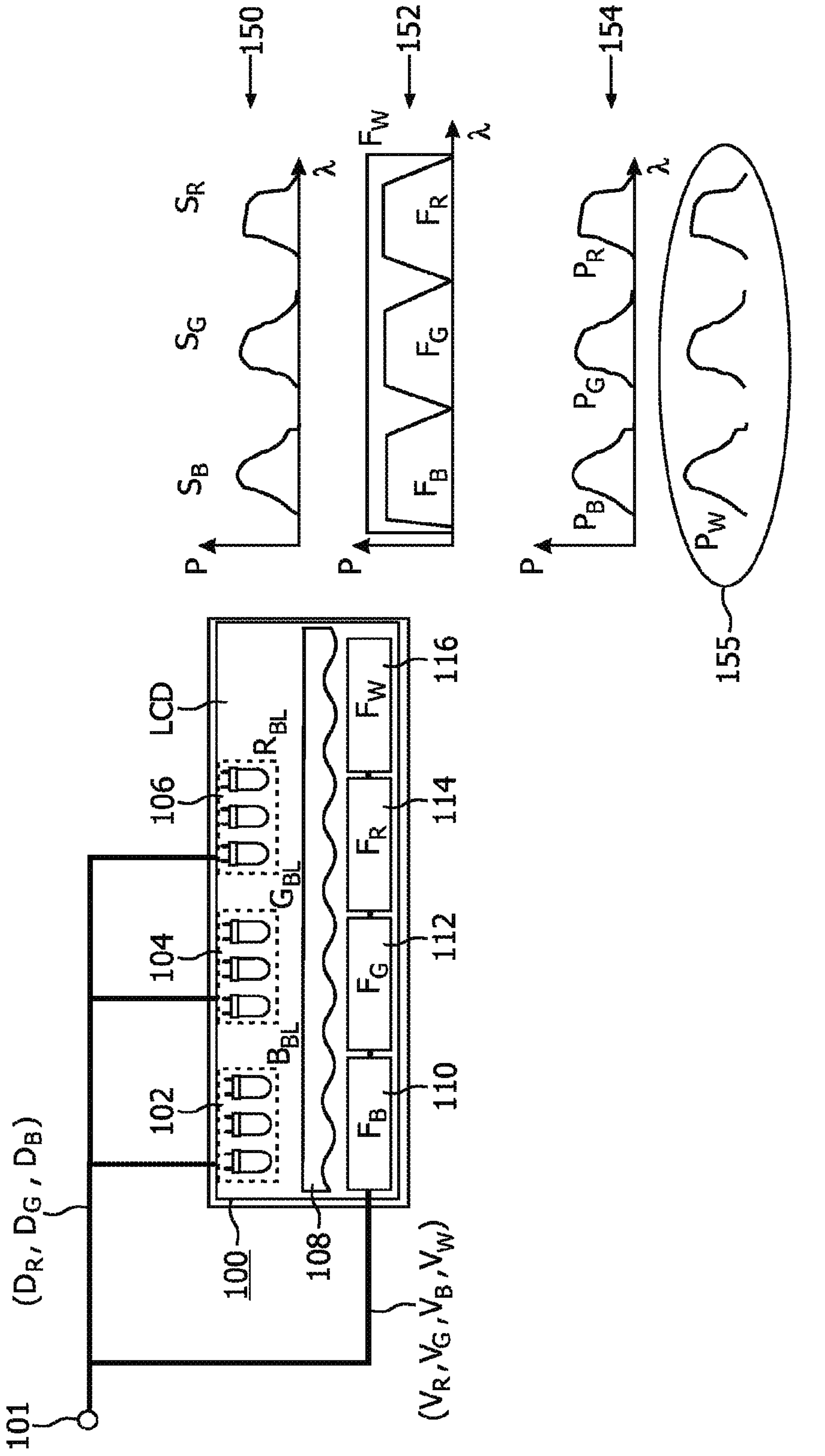

| | | | | |
|---|---|---|---|---|
| 2005/0184998 | A1* | 8/2005 | Yang et al. | 345/589 |
| 2005/0270265 | A1* | 12/2005 | Plut | 345/102 |
| 2006/0232803 | A1* | 10/2006 | Hori et al. | 358/1.9 |
| 2006/0280360 | A1* | 12/2006 | Holub | 382/162 |
| 2007/0091057 | A1* | 4/2007 | Lee et al. | 345/102 |
| 2007/0139669 | A1* | 6/2007 | Lor et al. | 358/1.9 |
| 2007/0152953 | A1 | 7/2007 | Hong et al. | |
| 2007/0171186 | A1* | 7/2007 | Chang et al. | 345/107 |
| 2008/0150864 | A1* | 6/2008 | Bergquist | 345/89 |
| 2009/0160756 | A1* | 6/2009 | Van Beek et al. | 345/102 |

FOREIGN PATENT DOCUMENTS

| | | | |
|---|---|---|---|
| WO | 03091791 | A1 | 11/2003 |
| WO | 03094138 | A2 | 11/2003 |
| WO | 03094138 | A3 | 11/2003 |
| WO | 2004079418 | A1 | 9/2004 |
| WO | 2004112159 | A2 | 12/2004 |
| WO | 2004112159 | A3 | 12/2004 |
| WO | 2006111926 | A1 | 10/2006 |
| WO | 2007023425 | A2 | 3/2007 |

* cited by examiner

OPTIMAL BACKLIGHTING DETERMINATION APPARATUS AND METHOD

The invention relates to a method of calculating an optimal first and second backlight driving level, for a color display having a backlight which can be controlled to produce a first amount of light with a first spectrum in accordance with the first backlight driving level and a second amount of light with a second spectrum in accordance with the second backlight driving level, and the color display having a first and second light transmission valve plus color filter combination, arranged to create from the backlight spectra a respective first and second color primary light output, the chromaticity of at least one of the color primaries depending on the first and second backlight driving level, and corresponding apparatus unit, which can be incorporated in displays and cameras, and software.

A number of displays create their pictures by having an in-display light creation unit which is placed behind a modulation unit, e.g. for each (sub)pixel a combination of a filter to create a local color, and a valve to create an amount of color. E.g. a transmissive LCD has the property that the amount of light exiting (ignoring for the moment the spectral behavior) is dependent via typically an S-shaped transfer function on the applied voltage. Other alternative principles valve by redirecting light, e.g. reflecting an amount towards a screen.

It is also known to make multiprimary displays of the above type, in which the optimal 3-color gamut (RGB) is replaced by a gamut spanned by several color primaries, e.g. red, yellow, cyan and blue, or for increased luminance RGBW, where W is a white color, e.g. D65. In this case, the 4 or more valves need the appropriate driving values to reproduce an input standardized RGB, or XYZ color, which is because of the underdeterminedness a somewhat difficult task, although in the past a number of techniques were developed that are applicable to one or several of the available multiprimary displays.

It is also known to scale uniformly the luminance of the backlight, e.g. if one has a dark scene, one can turn the backlight down, so that for the brightest of the dark colors, one of the valves, e.g. the blue one, is maximally open. This has as an advantage e.g. increased contrast for the dark scenes in case of light leakage through imperfect valves.

It is an object of the present invention to improve the control of displays.

This object is realized in that in the method and unit the first and second backlight driving levels are determined so that a gamut of at least a part of a picture to be displayed is optimally covered by the gamut realizable by the display with the first and second backlight driving level.

Gamut fitting will not be so easy if (at least one of) the primaries themselves are also a function of the backlight, but having to consider the entire system, one could then as in the insight of the inventors reconsider the problem as a backlight driving determination problem. One can then analyze how changes in driving of one backlight unit severely impact the shape of the displayable gamut, and hence its match with input picture gamuts of pictures or parts of pictures (perhaps one wants only the blue ocean to be faithfully displayed, allowing some errors on the fish). Therefrom one can optimally balance how all the primaries contribute, e.g. in a more simple system to explain how the picture color energy is balanced between the white and the RGB contributions.

Optimal backlight driving will typically mean that the input and displayable gamut largely overlap, e.g. that the input gamut is fully and snugly encompassed by the displayable gamut. Several relaxation embodiments options are possible however, e.g. that one includes a penalty function disallowing the driving of a certain backlight unit to go above a certain value, or that if the blue ages twice as fast as the red (or consumes far more power), that the ratio between the blue and red drivings (preferably or always) stays below a certain value, or that some irreproducible colors in some regions of the input gamut are tolerated, etc. This leads to a somewhat imbalanced optimum, of course the main intention being that a predetermined majority of the colors in the input picture(s) is reproducible, so that the display is not too bad.

These and other aspects of the method and unit according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. electromagnetic fields.

In the drawings

Figure 2:
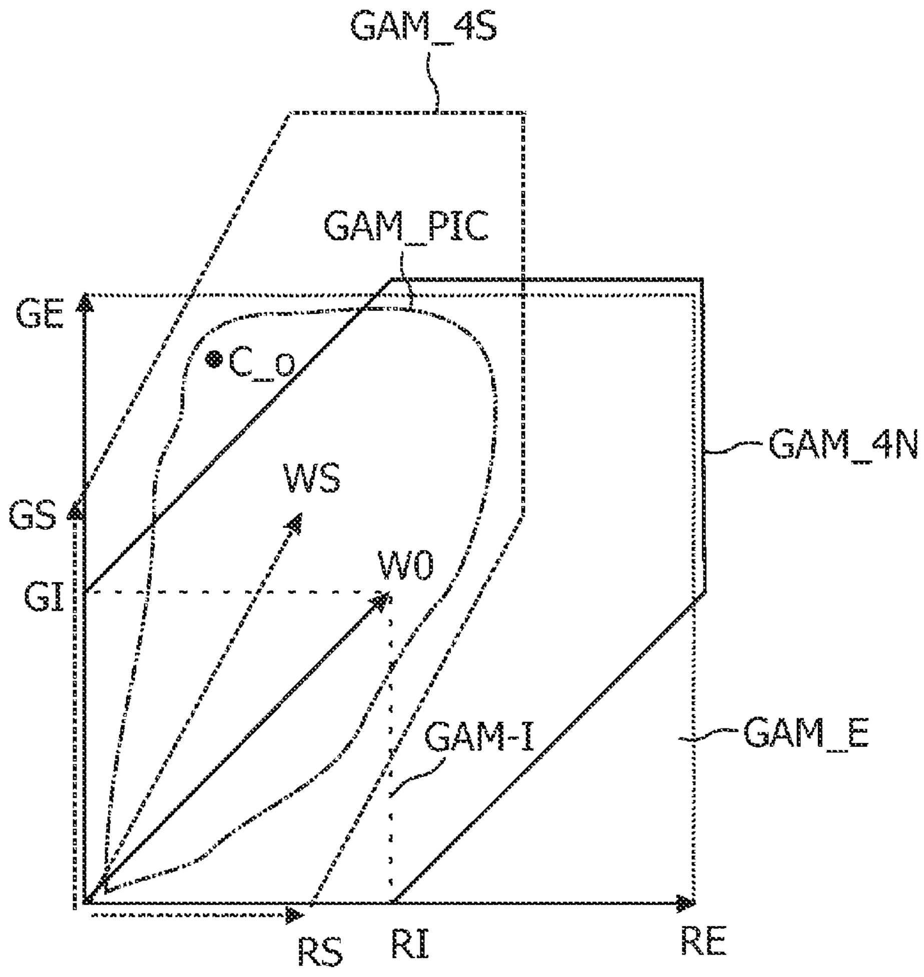
Figure 3:
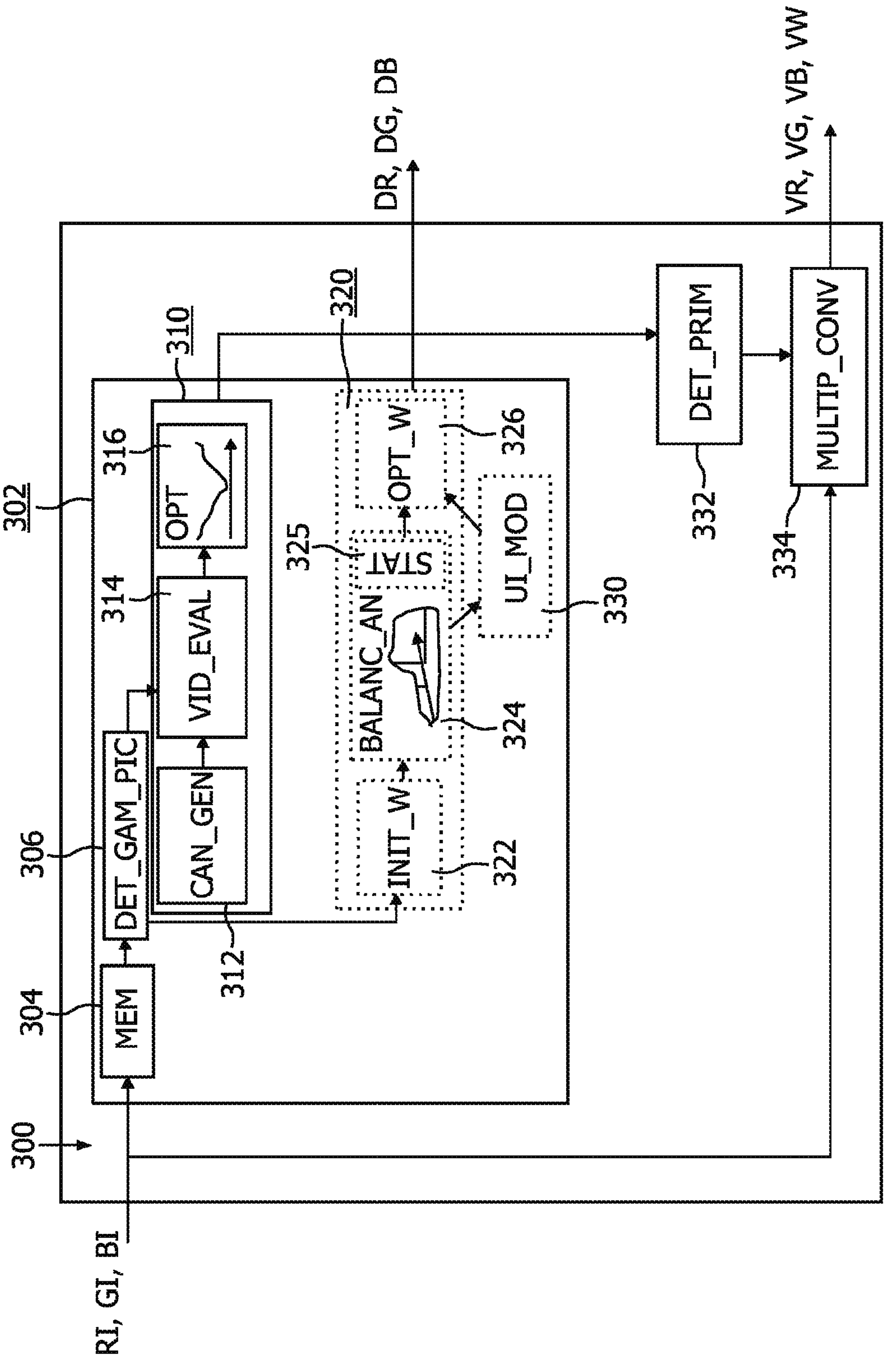
Figure 4:
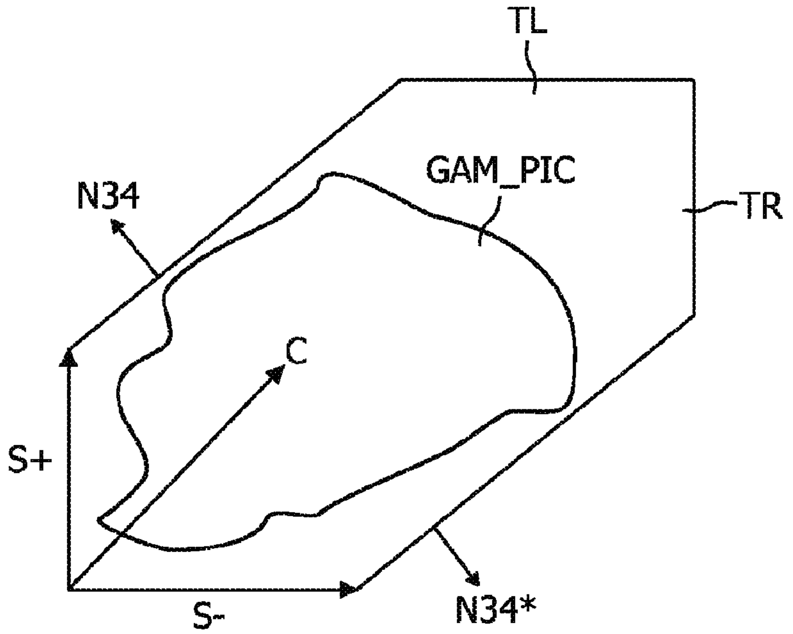
Figure 5:
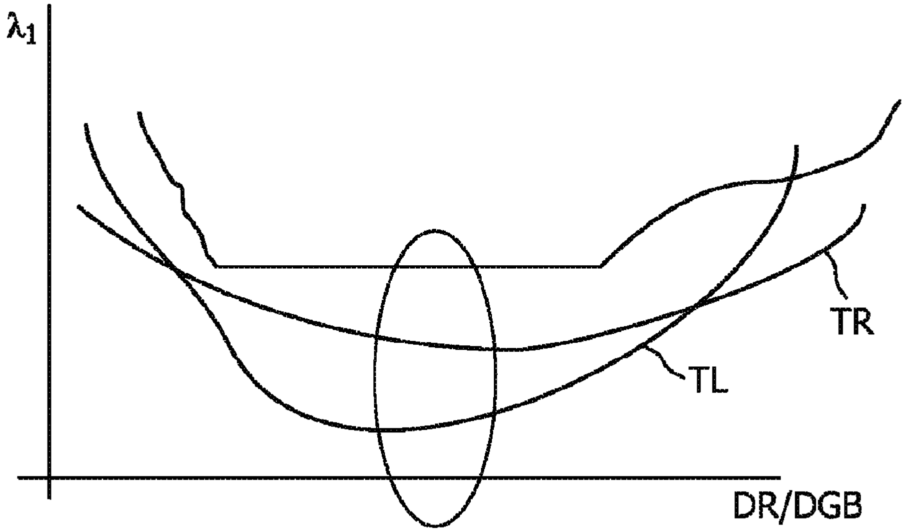
Figure 6A:
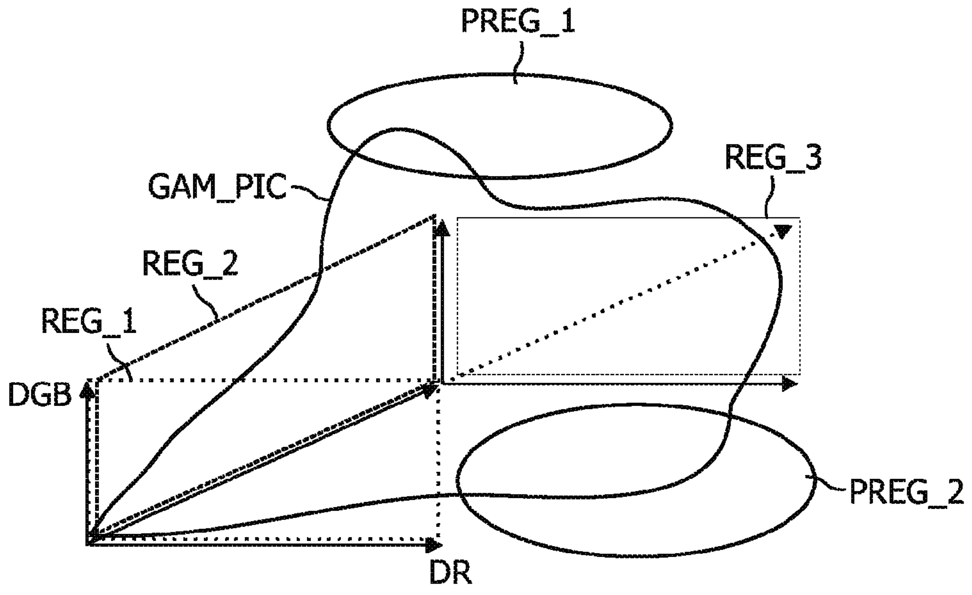
Figure 6B:
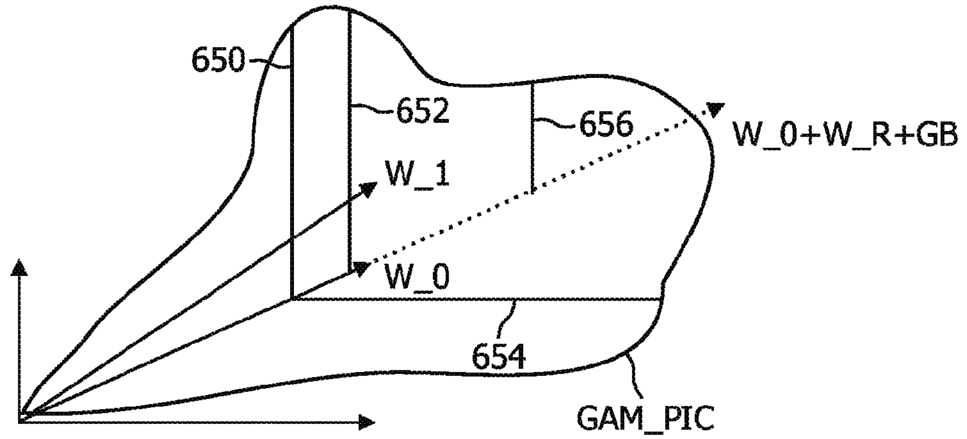
Figure 7:
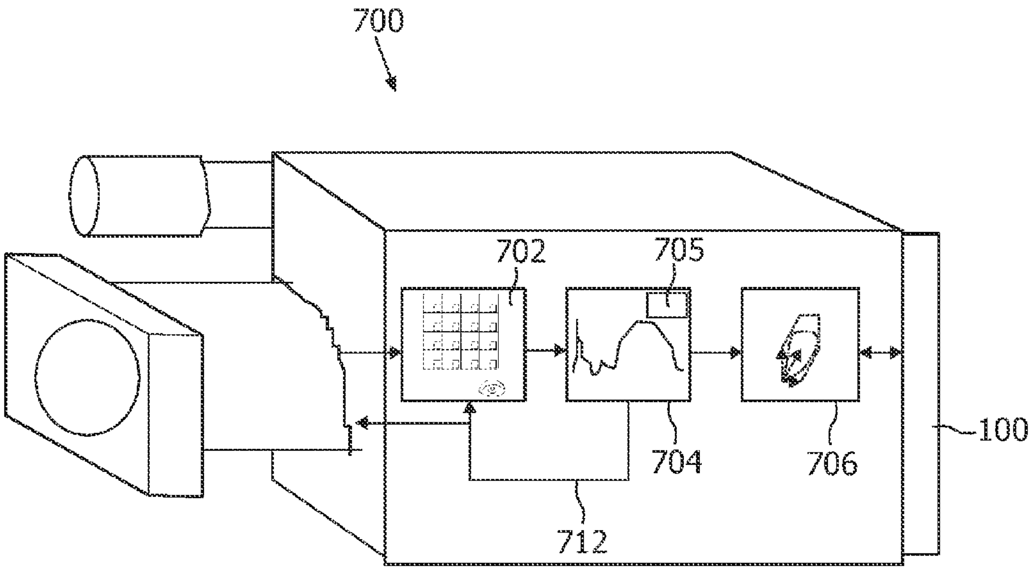

FIG. 1 schematically illustrates a display with a dependent variable primary problem;

FIG. 2 schematically illustrates the change in displayable gamut (GAM_4N to GAM_4S) as a function of variation of a backlight dependent white primary;

FIG. 3 schematically illustrates shows a color conversion apparatus comprising some alternatively usable embodiments of the backlight driving calculation unit;

FIG. 4 schematically illustrates how to mathematically determine whether the input colors are displayable because they are within the bounding planes of the displayable gamut of the display with particular backlight driving;

FIG. 5 schematically illustrates how to derive the optimal backlight unit luminances, e.g. as a multiplication factor for standard unity driving;

FIG. 6 schematically illustrates an other algorithm to arrive from an initial value at the correct driving values, particularly elegant for use with systems with a dependent white; and FIG. 7 schematically illustrates the backlight driving calculation unit incorporated in a scene adaptive camera.

FIG. 1 shows for explanation purposes a very simple display 100 (e.g. LCD) in which a primary chromaticity (i.e. hue and saturation; not of course only the trivial luminance dependence) dependence occurs, namely a rather strong variability of the white.

Blue backlight 102, and the green and red backlights 104, 106 each produce corresponding backlight spectra SB, SG, SR, in graph 150. These backlights can be, e.g., Light Emitting Diode (LED) arrays, homogenized by homogenizer 108.

Pixel color values are realized by valving (i.e. transmitting a fraction) the backlight with respective valve+filter combinations. E.g., blue filter 110 (or similar green 112, red 114, white 116) may consist of an LCD material (the color transfer characteristics are at present for simplicity assumed to be a pure non-linear luminance transmission function of the valve drive level VB) and a color selective filter, the spectrum FR of which is shown in graph 152. The final light output spectrum PB in graph 154 follows from the multiplication of SB and FB—the height of FB being able to take into account how much the valve transmits—, since in this simplistic example it is assumed that the different backlight spectra fit entirely in their respective color filter spectrum, and these filter spectra are not overlapping.

The relationship between the output luminance of such a color primary (because the hue and saturation stays fixed in a linear system) and the driver values is then simple and interchangeable, namely, one can either as is typical change the valve driving level VB, or equivalently the blue backlight driving level DB.

But even for this simple configuration, the white primary will be dependent on all backlight driving values: since the white filter FW transmits all spectra, the white output spectrum 155 will depend on the particularly set contributions of the three backlight spectra.

Whereas driving a multiprimary (4P) display is relatively simple when only the valves are controlled, it becomes a coupled problem when one also controls the backlights.

The variability of the white primary in dependence on the backlight control, and the impact to the shape of the gamut realizable by the display is shown in FIG. 2.

An RGBW display has an elongated double diamond shape in 3D, the projection of which in two-dimensions (for simplicity we choose red and green) is a hegaxon, like GAM__4N [the solidly drawn hexagon in FIG. 2]. Input colors, to be reproduced as faithfully as possible will be described for simplicity in an RGB space which coincides with the RGB primaries of the display, which can be easily realized by matrix color transforming from another input space like XYZ, or another RGB space. Note that the white W0 of a display transmitting a majority part of the backlight spectra via a white filter FW need not be equal to the sum of the R+G+B open valve driving (R+G in the 2-dimensional projection), but for simplicity of explanation this is also assumed.

Having an extra primary which can give light (we ignore for simplification in this discussion also geometrical form factors and other aspects regarding the distribution and uniform scaling of backlight energy) means that we can reproduce more colors than the ones of the original RGB input gamut GAM_I [the small, dashed square]. Compared to an extended gamut GAM_E [the larger dotted square] spanned by the doubles of the RGB primaries (since in the display of FIG. 1 the chromaticities of these primaries doesn't change) there are some of the colors that cannot be reproduced (color C_o is out of the gamut GAM__4N of the RGBW display with white W0 equal to R+G+B, with an equal most luminous color; i.e. an equal luminance white output light), but most of them can, at least the less saturated ones. One can hence profit from such a display by increasing the luminance and/or saturation of the input colors, so that the display looks more vivid. Stated otherwise, as is customary in some of our recent research, one can boost the input colors times 2, which would amount to reproducing them on a normal RGB display but with double the luminances of RIGIBI, and then use a gamut mapping strategy to convert to the RGBW gamut GAM__4N of the actually present display, thereby doing in fact a conversion to multiprimary driving values. For unreproducible colors (e.g. C_o), one would then need a strategy which maps them within gamut, which typically has as a disadvantage that the texture modulations for regions which such colors become badly represented (in bad gamut mapping strategies even removed due to clipping).

If one scales the backlight of the red, so that a maximally open red valve 114 yields an output color Rs, and similarly increases the green backlight so that an output light color GS is obtained for (VB=0, VG=1, VR=0, VW=0), then a new white WS is obtained for (VB=0, VG=0, VR=0, VW=1), which is of course more greenish, since in the backlight the greenish contribution was increased relative to the reddish (which can be realized e.g. by sending more current through the green LEDs, and dimming the red LEDs). This means also that the realizable gamut is changed to GAM__4S [dashed hexagon]. The inventors realized that instead of the usual conversion to RGBW coordinates, which can be realized by setting the valves 110, 112, 114, 116 to the best approximating values to yield the best approximation of the output color to be reproduced, one can also change the driving values (DR, DG, DB) of the backlight units 102, 104, 106, so that a new gamut GAM__4S is realized, now encompassing the unrealizable colors C_o. Somewhat more ambitiously, using such a strategy, one best calculates the backlight driving values such that the gamut optimally matches with the colors to be reproduced. E.g. if a picture of a forest comprises mainly green colors, as seen in the input picture gamut GAM_PIC, the driving strategy realizing GAM__4S will do fine as all colors can be reproduced nicely, and not much excessive light energy is wasted. As input data making up the input gamut, also e.g. all the frames of a movie shot can be used, or for (within the 2D display plane) geometrically variable backlights, such as a scrolling backlight illuminating sequential strips of the display, a current subregion of the currently displayed picture may be used.

The optimal match may also be specified in a number of ways: e.g., typically one wants a tight match in color space between the encompassing hull of the input gamut and the realizable gamut of the display (which has its bounding planes tangent to the most extreme points of the input gamut), or one may want to exclude a certain percentage (or certain geometrical regions of the input gamut in color space) of difficult to represent input colors, so that one can drastically save on backlight power, yet still represent most colors faithfully. The optimization criterion may include further constraints, such as e.g. a cost function representing the aging of the different backlights as a function of required power, which is i.a. interesting to select an optimum in case there would still be several reasonably optimal strategies.

FIG. 3 describes a color conversion apparatus 300—e.g. a part of an IC, or software running on a processor-arranged to determine from (e.g.) RGB input values, multiprimary values for the valves (VR, VG, VB, VW) and—e.g. on the basis of collected colors appearing in a shot consisting of N consecutive images—driving values for the backlight units DR, DG, DB. The latter are obtained by backlight driving calculation unit 302, arranged to calculate optimal backlight driving values, given which content is to be displayed (e.g. on static image display the colors in a photo). This is done by storing the RGB (or similar, but for simplicity we describe the operations in RGB space) values of at least a region of an image (e.g. a stripe, or a background region, containing all blue pixels except for the less chromatic ones of a foreground swimming fish) in a memory 304, and then determining by an input gamut determination unit 306 a representation of the input gamut, such as a three-dimensional solid (most simply with a 1 value if the color occurred or 0 otherwise), or a three-dimensional table containing numbers or vectors, such as e.g. a histogram in which also frequencies of occurrence are recorded, or even more data such as information—result from an evaluation algorithm—describing the relationship of the pixel with its surroundings or the entire image, or a hull of the occurring colors, etc. The information regarding the meaning of the pixel may be used later on in an intelligent evaluation/optimization to decide what the impact would be of making a pixel unrepresentable or needing further gamut mapping for the chosen representable gamut, e.g. outliers that occur only in a few small spots, especially if they are likely not to contribute significantly to the human perception of the picture may be discarded.

In the exemplary embodiment two alternatively usable evaluation systems are comprised, of course other algorithms being possible to arrive at the same result.

Exhaustive optimization unit 310, first generates exhaustively a list of candidate gamut bounding planes, a priori and stored in a memory or on-the-fly.

E.g., let's for simplicity of understanding describe a display with overlapping green and blue filters and a non-overlapping red path, so that we decide to drive blue and green with a common factor (so that there is no further chromaticity dependence in this sub-part, rather we can focus the explanation on the dependency of the white solely), and red separately.

We can describe this in a canonical basis:

$$\begin{pmatrix} R \\ - \end{pmatrix} = \begin{pmatrix} x & 0 \\ - & - \end{pmatrix} \begin{pmatrix} D_R \\ D_{GB} \end{pmatrix}$$

Hence, because of the 0 in the second column, we see that red doesn't depend on the driving of the green and blue backlight units, but only on the red backlight driving, making the red output primary invariable in chromaticity and only scalable in terms of its luminance. This is indicated with the "–" signs, by which we mean that an actually particularly chosen red or other basis vector may of course have a greenish component, but we have rotated the vector to a canonic axis system comprising the red light output primary itself.

The x is the amount of red output that corresponds to e.g. a unitary red backlight driving DR, and can further include the red valve transmission, making the meaning of R then the final light output of the canonical red primary.

Similarly we find for green and blue:

$$\begin{pmatrix} - \\ G \end{pmatrix} = \begin{pmatrix} - & - \\ 0 & y \end{pmatrix} \begin{pmatrix} D_R \\ D_{GB} \end{pmatrix}, \begin{pmatrix} - \\ B \end{pmatrix} = \begin{pmatrix} - & - \\ 0 & y \end{pmatrix} \begin{pmatrix} D_R \\ D_{GB} \end{pmatrix}$$

and for white:

$$\begin{pmatrix} W_R \\ W_{GB} \end{pmatrix} = \begin{pmatrix} a & b \\ c & d \end{pmatrix} \begin{pmatrix} D_R \\ D_{GB} \end{pmatrix},$$

which could also be diagonalized, but anyway shows the dependency on both backlights.

We can then describe most of what is happening in such a red-cyan (blue and green) projection (FIG. 4), although the calculations actually occur in 3D, the projection of the constrained N-dimensional space, or even in N D.

Each plane is determined by a normal (e.g. N34) and an offset vector (e.g. S+, which may be equal to the cyan primary of a particular power or luminance or equivalent.

It is important to note that before methods have been disclosed to optimally scale vectors (or supports), but now the problem is more complex in that the orientations of the planes, or equivalently their normals, also change (because of the backlight control which is backlight color control and not mere luminance control).

This makes the problem mathematically much more complex, making it enticing to design relatively fixed systems, with the aid of look-up tables.

Backlight driving candidate generator 312 is arranged to generate a subsampled set of possible driving controls, to a desired prefixed accuracy.

E.g. in this example, it suffices to generate a set of possible ratios of DR and DGB, which spans the entire range of possible whites and corresponding gamuts:

$$\begin{pmatrix} k1 \\ k2 \end{pmatrix} \in \left( \begin{matrix} 1 \\ 0.1 \end{matrix}, \begin{matrix} 1 \\ 0.15 \end{matrix}, \ldots \begin{matrix} 0.1 \\ 1 \end{matrix} \right)$$

The normals and offset vectors for all the bounding planes can mathematically be easily calculated.

The pixel color analysis unit 314 gets the gamut GAM_PIC of the (region of the) input picture(s) [could also to reduce the amount of colors to be tested derive the hull of the gamut of all colors, i.e. those on the boundary], and derives for each orientation scaling factors (for the backlight driving) so that the gamut optimally matches (this may be e.g. so that none of the picture colors falls outside the realizable optimal gamut, but also some of the colors may be discarded), e.g.:

$$\lambda_{-}(N34^{*}\cdot S-)=\max_{\forall C}(N34^{*}\cdot C)$$

$$\lambda_{+}(N34\cdot S+)=\max_{\forall C}(N34^{*}\cdot C)$$

which guarantees that all colors fall into the gamut (note that the scalings of the offset of a plane can mathematically simply be related to the scalings of the driving levels—for the lower bounding planes they are typically identical—so the description below could also be formulated in terms of DR and DGB). The dot signifies the vectorial inner product, and C is one of all the colors in the input gamut GAM_PIC.

This gives a number of curves (FIG. 5) as a function of the ratio DR/DGB of those minimum scaling factors $\lambda_{-}$, $\lambda_{+}$ (or in fact DR and DGB) etc. required for all the bounding planes (e.g. if the input gamut grazes the plane spanned by N34* and S−, scaling down both lamdas according to the DR/DGB ratio will not lead to outliers across that plane, but e.g. there may appear outliers across the top plane TL and/or TR).

FIG. 5 shows a graph in which the lambda 1 (which is taken the lambda which determines e.g. the scaling of the red backlight, but in general some lambdas may correspond to the scaling of offset vectors being sums of primary vectors) for all the planes is shown. A similar set of curves exists for the cyan scaling lambda 2. The optimum should be chosen, i.e., if there would be only one lambda, we would choose the one which requires that all the planes bound the input gamut, i.e. with the minimal value of the maximum required values of all the planes, i.e. somewhere in the superimposed ellipse (since in the example there are several optima). Actually, one wants the solution for which the aggregate of all driving values is optimal, which is most simply done by applying an aggregation function to accumulate the different graph sets. This can be done e.g. by converting the graphs to DR and DGB (as function of the ratio) functions and summing these, and then take the minimum of e.g. (DR+DGB)/2. This aggregation function may advantageously take into account further requirements, such as e.g. that one of the backlights ages faster than the other, or uses too much power compared to the others, and should hence have a lower driving, in which case one minimizes an aggregate power function (PRDR+PGBDGB)/2, in which the PR and PGB are per unit power consumptions of the different backlight units. This optimization is performed by the optimizer 316.

FIG. 6 schematically illustrates how the second, iterative optimization unit 320 of FIG. 3 may be designed to function. These strategies use the principle that the gamut GAM_PIC has to be divided in a balanced way between the white and the chromatic colors. In the darker regions colors can both be formed by a composition of red and cyan or with white and an appropriate color (REG_1), however use of the white can be made for making the colors in e.g. REG_2. However, in the upper, high luminance regions (REG_3), colors must be made by a composition of the three colors R, GB and W (because one has the pixel white already, for simplicity with a form factor so that the energy is equal to a R+GB, one wants to open this as much as possible to avoid creating extra backlight, so that typically in this region of the gamut this white contribution will about be equal to the R+GB contribution; one could do that for the brightest input color—"the input white", but much more smartly looking at the shape of the gamut, and allowing better fit and perhaps even smart clipping). In particular, there should not be too many (undesirable) problematic areas PREG_1, PREG_2.

First initialization unit 322 determines a good starting white W_0, e.g. the center of mass of the input gamut GAM_PIC, or the brightest color divided by 2, . . . .

Then the deviations to the white, which are the amounts of other primary colors to be added to create the desired colors are analyzed.

Both in the darker regions there should be no (or not too much if one relaxes the matches and allows clipping to save on backlight power, e.g. for mobile devices, where the video quality is not so good anyway due to heavy compression) cyan GB contributions 650, 652 in any faraway regions that require a higher contribution than maximum cyan to create the white W_0, but the same should be true for the reds (654), and also in the lighter regions this should be true (656). If one increases cyan, one should know that this has a consequence on white and hence red, and one should keep these balanced: does a double (cyan and red) increase help to at the same time solve the outlier problem in the redder region of the gamut (654), or is it merely a local green problem, i.e. one would like a greener white, which needs to be compensated by more red in the redder regions then. This can be done by taking into account the measured deviations (by a primary driving balancing analysis unit 324), and in more advanced strategies also their position, or the areas and/or moments of problematic outlying regions (possibly weighed with how important such an error is judged, whereby some points can also be removed a priori from the histogram after images analysis, e.g. if some green outlier colors are only small sparsely distributed highlights, and also incorporated in surrounding green colors, or even contrasting colors, the image processing may evaluate this as a model of unimportant patterns, and discard such values, e.g. by replacing them with less saturated values which will give equivalent rendering, or the points may be retained in the histogram but flagged that they may be given less importance in the optimization, etc.). In general any such statistic on the (possibly greater than 1, or maximum) valve values required to reproduce the input gamut given a current backlight driving estimation (or white) will be done by statistical evaluation unit 325, and be converted to a value for update, e.g. a ratio of outlying areas leading to an update angle. One can therefrom derive a new white W_1: this could be either simply a direction of change, upon which a fixed step change is performed, or also from the analysis an estimated step size, e.g. a rotation angle, and white size change. This can be sufficient, and lead to a single step process, e.g. in case one just scales everything so that there are no more values above maximal valve driving for any of the primaries (distributing the maximal difference equal between the white and colors, retaining the current white direction), which gives a somewhat suboptimal but still rather optimally matching reproducible gamut.

In this case the optimization unit calculates with an algorithm a single correction to obtain the final white W_1 and therefrom the backlight driving values, or this second W_1 can iteratively be fed into the primary driving balancing analysis unit 324 to iteratively converge.

The advantage of such an analysis is that a user may interact via a user interface unit 330, i.e. he may have control on the optimization and the errors. In such a way he may e.g. explicitly tune a white too greenish, taking into account the artifacts.

Finally, having new driving values, primary determination unit 332 can determine the new (e.g. R,G,B,W) primaries, e.g. by multiplying the scaled backlight spectra with the filter spectra (maximally open valves), and where required also taking into account LCD material/cell behavior etc.

Conversion to the new required valve values VR . . . VW can then be done with any previously disclosed multiprimary transformation algorithm or unit 334, e.g. the one we described in EP application 05107669.3.

It should be noted that although we described the principle above with a simple RGBW display, other displays will suffer the same problems and can be optimized with the same kind of system. E.g. already a system with overlapping green and blue filters i.e. filter+valve combinations may already have both primaries depending on the both backlight unit drivings. E.g. the iterative method can be simply generalized by initializing all primaries which chromaticity (hue and/or saturation) varies with the backlight (the constant chromaticity primaries, e.g. a red which always only passes the red spectrum, are simple in that they need only be set to their constant value), and then check how well the input gamut is covered (i.e. within valve driving values between 0 and fully open signal maximum, e.g. 1 or 255), and how this changes by changing the backlight driving values and hence the variable primaries and the gamut they cover. This can be done either by trial and error, or mathematically quantifying the effect of the changes and therefrom derive a safe update value so that the input gamut can be optimally covered.

As mentioned already above, various geometric and/or colorimetric pre-analysis can be performed to define what is meant by optimal covering, e.g. by modeling human vision, e.g. the impact of a color is determined by its surrounding, for which e.g. retinex-type surround evaluations can be done. Depending on the reproduction importance value output of the algorithm, a color may be marked with such an importance parameter, e.g. in the test of valve values required for adding a chromatic color to the current white, colors with an importance parameter below e.g. 5 may be ignored, so although to reproduce them a valve driving value above 1 would be needed, to reproduce colors of importance above 5, a valve driving of 0.9 would suffice. If one has sufficient continuity and confidence of the importance parameters, one could also evaluate weighed measures of irreproducibility of the current display gamut. E.g., rather than to count an amount of outlying colors, or the distance of the most outlying color (the amount of valve driving above 1 required), one could weigh an accumulative mismatch as e.g. the distance of an irreproducible color times its importance, and perhaps times its occurrence in the image region to be faithfully reproduced (e.g. a bright sunset). Examples of pure calorimetric analysis—not taking into account the values of geometrically surrounding pixels—is e.g. looking at the histogram and identifying a small set of outliers, which could be identified as specular illumination highlights, and safely be replaced by another still very white looking value. Similarly, one could have an a posteriori geometric and/or calorimetric analysis of images (e.g. the current region to be displayed or other, similar or dissimilar images which may need to reproduced later), to analyze e.g. the loss of picture detail in clipped regions, and this could be coded as an additional number or vector attached to at least some of the colors in the input gamut being an artifact severity parameter, so that in a second step, e.g. outlier colors of artifact severity parameters above 10 should really be included in the display gamut, even at a cost of strongly driving some backlight unit, but one could then still save on leaving other outlier colors of lesser artifact severity. A user control (user interface unit 330) may allow a user to interact with this process, whereby e.g. the artifact analysis postprocessor (not shown in the drawings) may draw a red perimeter around the clipping artifacts or even make them more severe in case of compressing gamut mapping, so that a user may better notice them. The user interface unit may further have means allowing to user to rotate a (e.g. white) primary vector and see the effect, or re-initiate the automatic convergence etc.

In general a few examples of displays which may benefit from the present conversion systems and algorithms are: R, G, B displays with R,G,B backlights, or P1, P2 backlights, where P1 and P2 are typically—though not necessarily, since one may desire displays with a color cast-complementary colors so that they together give white, R,G,B panels with R,G,B,W backlight, RGBW panels with RGBW backlight, R,Y,C,B panels (where Y and C may e.g. be colors that span a 2D gamut polygon, such as yellow and cyan), temporally driven panels, such as a spectrum sequential display with magenta and green color filters and (G,B) backlight illumination during odd periods and (G,R) illumination during even periods, etc.

The invention may be useful for wide gamut displays and accompanying optimal content improvement (the gamut extension unit is not shown in FIG. 3, but can e.g. be a preprocessor or incorporated in 306), or rather for small gamut displays such as mobile, and optimal power saving.

The present invention is also interesting in cameras 700, with dynamic capturing possibilities as described in European currently not yet published application 05107835.0.

It is expected that in the future customers will want better control over the color capturing capabilities and picture color rendering of a camera, but on the other hand on holiday not all pictures need be of the highest quality (e.g. a quickly shot picture of a funny dog), and one could save e.g. on battery power. EP 05107835.0 describes that a user can select e.g. to capture a very high dynamic range picture with dark blacks yet also bright highlights, or capture the same image in a somewhat contrast-less fashion. This is done via captured image analysis unit 704, which can control via a return control channel 712 e.g. sensor 702 properties or other imaging properties for subsequent images to be captured (e.g. such image capturing parameters as exposure time, a color saturation increase, introducing an overlayed color cast to make the image look more sunny, . . . ). Coordination unit 705 can take this information, and the capabilities of the display 100—e.g. an outside LCD, electrowetting, E-ink . . . display—into account to derive in the backlight driving calculation unit of the color conversion unit 706 an optimal gamut and corresponding driving values. One could e.g. make sure that a high contrast captured picture is already as optimally displayed as the display allows, so that the user has a more realistic view on the effect of his actions on the image quality of the image to be stored or transmitted, or the coordination unit 705 could have pre-stored profiles of displays—e.g. of a portable content viewer—so that this could also be taken into account in the optimization and final rendering.

To reduce calculations, candidates can also be determined based on a previous analysis, e.g. in case a shot is calorimetrically similar to a previous shot (or a couple of static images which are preclassified into a set, such as holiday beach pictures), the starting vector for the iterative method may be taken the optimal white of this previous shot, or even a candidate set of whites can be generated, e.g. comprising some deviations of that previous white, or other candidate whites. Also the exhaustive method can be speeded up by e.g. putting less ratios in the test set: if the previous bounding planes had certain slopes, one could limit e.g. the search to a range around this slope.

The algorithmic components disclosed in this text may in practice be (entirely or in part) realized as hardware (e.g. parts of an application specific IC) or as software running on a special digital signal processor, or a generic processor, etc.

It should be understandable to the skilled person from our presentation which components can be optional improvements and be realized in combination with other components, and how (optional) steps of methods correspond to respective means of apparatuses, and vice versa, i.e. the steps we described in methods correspond to units in embodiments of our apparatus and vice versa. Apparatus in this application is used in the broadest sense presented in the dictionary, namely a group of means allowing the realization of a particular objective, and can hence e.g. be (a small part of) an IC, or a dedicated appliance, or part of a networked system, etc.

The computer program product denotation should be understood as encompassing any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not in-depth mentioned all these options. Apart from combinations of elements of the invention as combined in the claims, other combinations of the elements are possible. Any combination of elements can be realized in a single dedicated element.

Any reference sign between parentheses in the claim is not intended for limiting the claim. The word “comprising” does not exclude the presence of elements or aspects not listed in a claim. The word “a” or “an” preceding an element does not exclude the presence of a plurality of such elements.

The invention claimed is:

1. A method of calculating a first backlight driving level and a second backlight driving level, for a color display for displaying pictures with a color gamut spanned by a number of color primaries having a backlight, the method comprising the acts of:

controlling the backlight to produce a first amount of light with a first backlight spectrum in accordance with the first backlight driving level and a second amount of light with a second backlight spectrum in accordance with the second backlight driving level;

outputting a first color primary light output and a second color primary light output by the color display having a first light transmission valve and a second light transmission valve plus a color filter combination formed from the first backlight spectrum and the second backlight spectrum, respectively, wherein a chromaticity of at least one of the color primaries depends on the first backlight driving level and the second backlight driving level;

determining an input picture color gamut of at least a part of a picture to be displayed;

scaling the determined input picture color gamut to form a scaled picture color gamut by changing valve drive levels of the first light transmission valve and the second light transmission valve, wherein a desired color is outside the scaled picture color gamut;

determining the first backlight driving level and the second backlight driving level for matching a color gamut realizable by the color display with the first backlight driving level and the second backlight driving level to the determined input picture color gamut; and transforming the scaled picture color gamut to a converted picture color gamut by driving the backlight with the determined first backlight driving level and the determined second backlight driving level, wherein the desired color is inside the transformed picture color gamut.

2. The method of claim 1, wherein the color display has a luminance variable white primary creatable by filtering the first backlight spectrum and the second backlight spectrum with a white filter and selecting a desired amount with a respective white valve, and a number of color filters and respective valves to form an additive white color, wherein at least the chromaticity of the white primary is dependent on the first backlight driving level and a second backlight driving level, wherein the act of determining the first backlight driving level and the second backlight driving level is determined as a function of at least the luminance variable white primary.

3. The method of claim 1, wherein the act of determining the first backlight driving level and the second backlight driving level comprises the acts of:

generating candidate bounding planes of the gamut realizable by the color display with candidate backlight driving value combinations; and determining a matching candidate backlight driving values combination by evaluating how much of a selected set of input colors of at least a part of a picture to be displayed is reproducible by the realizable display gamut.

4. The method of claim 1, wherein the act of determining the first backlight driving level and the second backlight driving level comprises the acts of:

estimating initial values for at least one output light primary which is dependent on initial backlight driving values;

evaluating how well a selected set of input colors of at least a part of a picture to be displayed is reproducible by the realizable display gamut; and updating the initial backlight driving values.

5. The method of claim 1, further comprising the act of applying a geometrical and/or colorimetrical algorithm to a selected set of input colors of at least a part of a picture to be displayed to evaluate a reproduction importance of the colors, wherein some colors are taken out of the set or marked with an importance parameter.

6. The method of claim 1, further comprising the act of analyzing severity of artifacts, and performing the controlling act to reduce the severity by changing the first backlight driving level and the second backlight driving level.

7. The method of claim 6, further comprising the act of attaching an artifact severity parameter to still irreproducible colors.

8. A non-transitory computer readable medium embodying computer instructions which, when executed by a processor, configure the processor to perform the method of claim 1.

9. The method of claim 1, wherein the number of color primaries is at least four.

10. A backlight driving calculation unit for calculating a first backlight driving level and a second backlight driving level, for a color display for displaying pictures with a color gamut spanned by a number of color primaries having a backlight which can be controlled to produce a first amount of light with a first backlight spectrum in accordance with the first backlight driving level and a second amount of light with a second backlight spectrum in accordance with the second backlight driving level, and the color display having a first light transmission valve and a second light transmission valve plus a color filter combination configured to create from the first backlight spectrum and the second backlight spectrum a first color primary light output and a second color primary light output, respectively, wherein a chromaticity of at least one of the color primaries depends on the first backlight driving level and the second backlight driving level, the backlight driving calculation unit comprising:

an input gamut determination unit configured to determine an input picture color gamut of at least a part of a picture to be displayed; and an optimization unit configured to:

scale the determined input picture color gamut to form a scaled picture color gamut by changing valve drive levels of the first light transmission valve and the second light transmission valve, wherein a desired color is outside the scaled picture color gamut;

determine the first backlight driving level and the second backlight driving level so that the input picture color gamut is matched by the gamut realizable by the color display with the first backlight driving level and the second backlight driving level; and transform the scaled picture color gamut to a converted picture color gamut by driving the backlight with the determined first backlight driving level and the determined second backlight driving level, wherein the desired color is inside the transformed picture color gamut.

11. A display comprising a backlight driving calculation unit as claimed in claim 10 configured to calculate driving levels, connectable to an adaptive multiprimary transformation unit configured to transform an input color to multiprimary drive values, the backlight driving calculation unit and multiprimary transformation unit being connectable to a display unit, wherein a backlight of the display unit is controllable by the driving levels, and valves of the display unit are controllable by the multiprimary drive values.

12. A camera comprising the display as claimed in claim 11, and a coordination unit configured to coordinate image capturing parameters with the driving levels and the multiprimary drive values.

* * * * *